W. J. PHELPS.
MACHINE FOR CUTTING SOLDER RINGS AND APPLYING THE SAME TO THE EDGES OF CAN CAPS.
APPLICATION FILED JAN. 23, 1908.
1,005,299.
Patented Oct. 10, 1911.
2 SHEETS—SHEET 2.
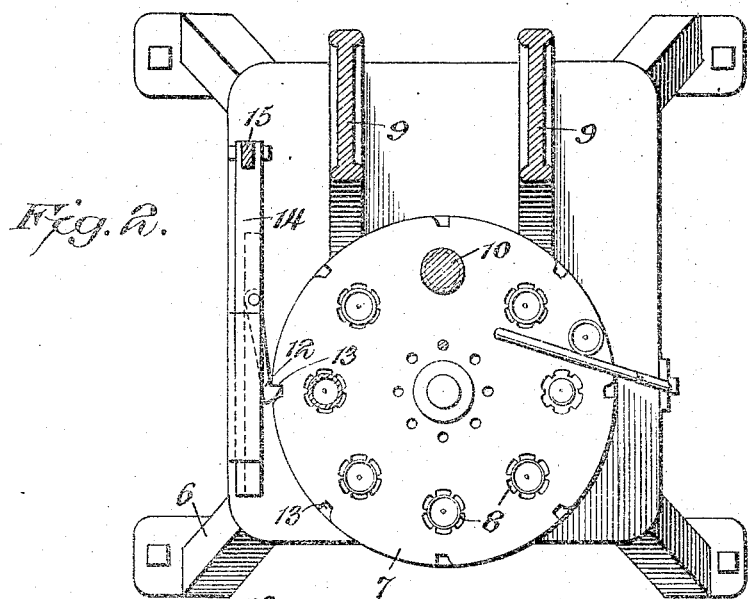
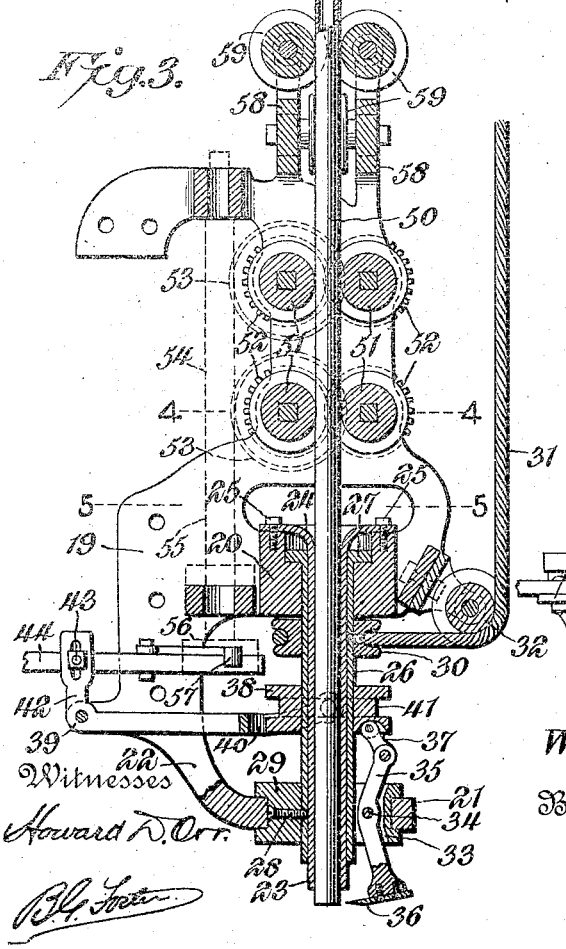
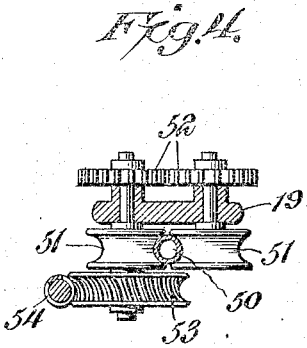
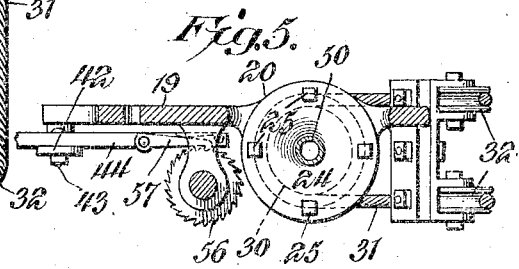
Walter J. Phelps, Inventor,
Witnesses
Howard D. Orr
By E. G. Siggers
Attorney though, are made in the present application to the general type of machine as the same will
UNITED STATES PATENT OFFICE.

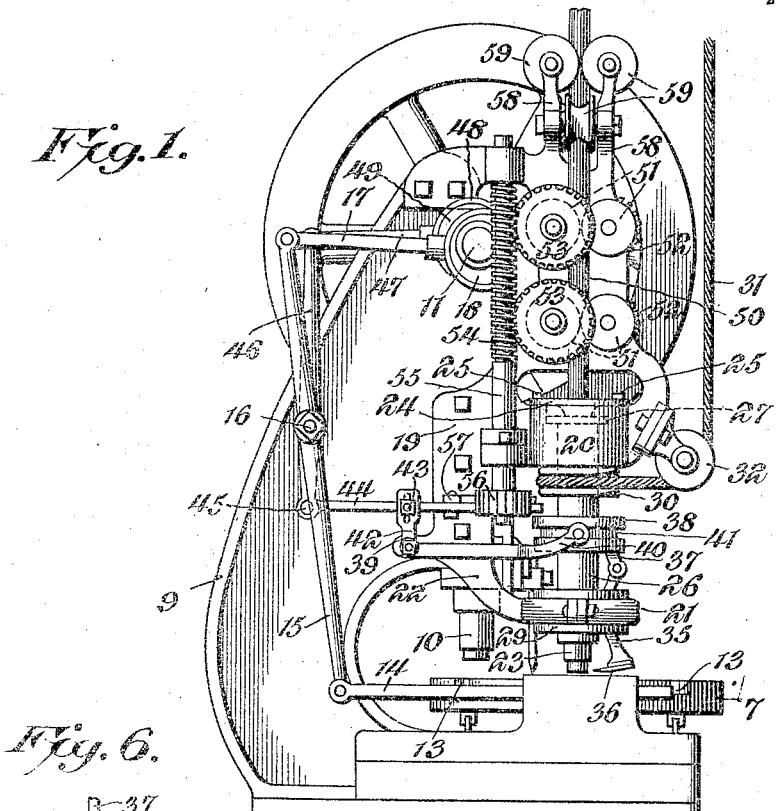
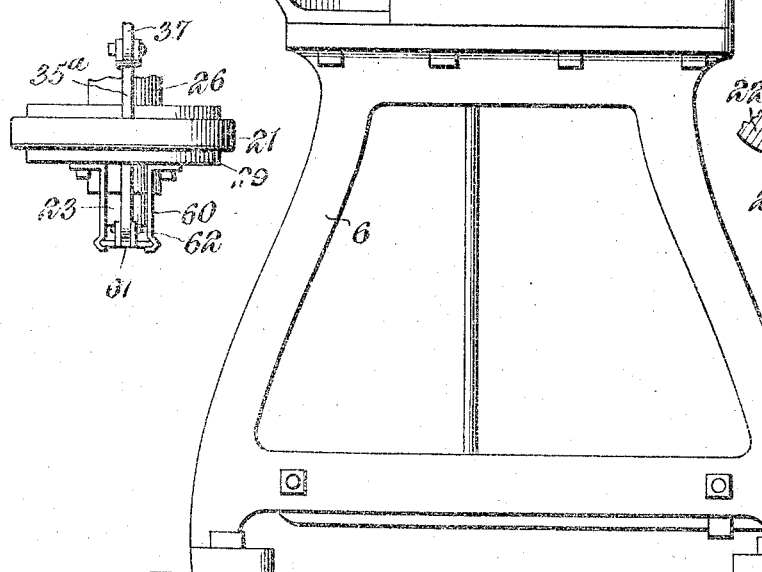
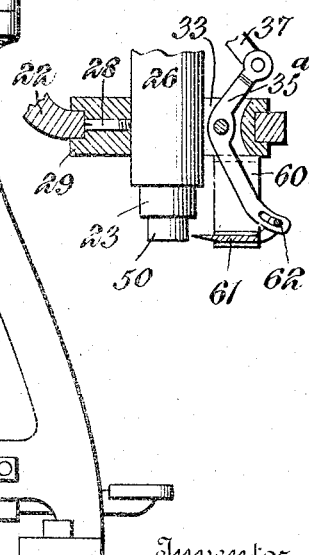

WALTER J. PHELPS, OF BALTIMORE, MARYLAND.

MACHINE FOR CUTTING SOLDER RINGS AND APPLYING THE SAME TO THE EDGES OF CAN-CAPS.

1,005,299.

Specification of Letters Patent.  Patented Oct. 10, 1911.

Application filed January 23, 1908. Serial No. 412,313.

*To all whom it may concern:*

Be it known that I, WALTER J. PHELPS, a citizen of the United States, residing at Baltimore, in the State of Maryland, have invented a new and useful Machine for Cutting Solder Rings and Applying the Same to the Edges of Can-Caps, of which the following is a specification.

The present invention relates to means for producing solder rings and applying the same to the edges of can caps.

The principal object of this invention is to provide novel and practical mechanism for cutting the solder rings from a long tube, said means being simple in its character and coöperating with any suitable form of applying mechanism. No broad claims, however, are made in the present application to the general type of machine as the same will be found in co-pending application, Serial No. 413,312.

In the accompanying drawings:—Figure 1 is a side elevation of the machine. Fig. 2 is a horizontal sectional view therethrough. Fig. 3 is a vertical sectional view through the ring forming mechanism. Fig. 4 is a horizontal sectional view on the line 4—4 of Fig. 3. Fig. 5 is a horizontal sectional view on the line 5—5 of Fig. 3. Fig. 6 is a side elevation of a slightly modified form of knife mounting. Fig. 7 is a sectional view therethrough.

Similar reference numerals designate corresponding parts in all the figures of the drawings.

In the embodiment illustrated, a suitable supporting frame 6 is employed, on which is rotatably mounted a conveyer or carrier table 7 provided in its upper side with a plurality of recessed seats or female dies 8. Supporting brackets 9 rise from the frame and carry suitable die mechanism 10 for applying solder rings to the caps. This die mechanism may be of any suitable character, and is operated by a shaft 11 journaled in the brackets 9. The rotation of the table 7 is effected by means of a reciprocatory dog 12, which engages in sockets or shoulders 13 formed in the periphery of the table, said dog being pivoted on a sliding link 14 that is connected to the lower end of a lever 15. This lever is fulcrumed between its ends, as shown at 16, and its upper end is connected to a link 17 operated by an eccentric 18 on the shaft 11. It will be understood that each movement of the table 7 by the dog 12 will bring a new recessed seat or female die beneath the die mechanism 10.

Secured to the outer side of one of the brackets 9 is a frame 19 in the form of a plate provided with spaced upper and lower bearing enlargements 20 and 21, the latter being carried by a depending arm 22. A tubular guide 23 extends downwardly through the bearings 20 and 21, being provided with an upper flared mouth 24 and being fastened against rotation by suitable screws or other devices 25 secured to the upper bearing 20. A rotatable sleeve 26 surrounds the tube 23 and preferably terminates short of its lower end. This sleeve has its upper end journaled in the bearing 20, and is provided with a flange 27 that prevents the downward longitudinal movement of the sleeve on the tubular guide. To its lower portion is secured by means of a screw 28 or other device, a collar 29 that is journaled in the lower bearing 21. This sleeve has a driving pulley 30 attached to it between the bearings and a drive belt 31, operating upon the pulley, passes around idlers 32, and is operated from any suitable source of power at a high rate of speed.

The collar 29 has a socket 33 therethrough, and fulcrumed in said socket, as shown at 34, is a lever 35. To the lower end of this lever is attached a slicing knife 36 having a shearing cut, while the upper end is pivoted to a link 37, which link is also pivoted to a reciprocatory collar 38 feathered upon the sleeve 26. A bell crank 39 is pivoted on the frame 19 and one arm of this bell crank is formed with a yoke 40, which has suitable engagements in a groove 41 formed in the collar 38. The other arm 42 of the bell crank is connected by a pin 43 with a reciprocatory link 44, and this link is pivoted, as shown at 45 to the lower end of an upright lever 46 fulcrumed between its ends. The upper end of the lever 46 is pivoted to another link 47 having a strap 48 that surrounds an eccentric 49 carried by the shaft 11.

The tube of solder which is to be cut into rings, is shown at 50, and is passed through the tubular guide 23. For the purpose of feeding this tube of solder, sets of grooved rollers 51 are journaled on the upper portion of the frame plate 19, the rollers of each set being geared together, as shown at 52. One roller of each set has secured to it, a worm gear 53, and these worm gears are in mesh with the worm 54 of an upright shaft 55 journaled on the frame 19 and having a ratchet wheel 56 secured to its lower end. A dog 57, pivoted on the link 44, operates on this ratchet wheel to effect an intermittent movement of the worm shaft. The frame 19 furthermore is preferably provided with upstanding ears 58 on which are journaled angularly disposed sets of straightening rollers 59.

As shown in Fig. 3, the tube of solder 50 has its lower end projecting below the lower end of the tubular guide 23, being wholly unsupported, and said lower end is located directly over and very close to the path of movement of the recessed seats or female dies 8 of the rotary table 7. The mechanism moreover is so arranged that when one of said seats or female dies is located below the die mechanism 10, another will be disposed directly beneath the lower end of the solder tube 50. When the parts are so located and the table is at a state of rest, the feed mechanism for the tube is stationary, and at this point, the link 44 is being operated to cause the yoke 40 of the bell crank 39 to swing downwardly. This will carry the collar 38 in the corresponding direction, which will cause the lever 35 to swing so that the knife 36 will move inwardly into engagement with the lower end of the tube 50. Inasmuch as said knife revolved at a high rate of speed and has a shearing action on the lower unsupported end of the tube, a ring will be severed from said lower end, and this ring will drop directly by gravity into the recessed seat or female die 8 that is located below the tube. As soon as the severing action takes place, the collar 38 is caused to rise which will swing the knife out of engagement through the tube, and when out of engagement, the dog 57 will operate on the ratchet wheel 56 to cause the partial rotation of the shaft 55, whereupon the feed rolls 51 will be rotated to cause a downward movement of the tube 50. This movement is comparatively slight, about one-fiftieth of an inch, but will bring the lower end of the tube sufficiently low to cause the knife 36 to cut another ring when said knife again moves into coaction with the tube. It will be noted particularly by reference to Figs. 1 and 7 that the upper face of the knife blade is flat, or in other words, that the entire body of said blade, which backs up or supports the knife edge, is not disposed closer to the end of the solder tube than the path of movement of the knife edge. As a result, the knife cuts through the tube without compressing the metal in the end of the tube above it, while the ring that is being cut or sliced from the tube is so thin that instead of the metal in it being compressed or crowded, the ring is bent or dished by the thickened downwardly inclined under portion of the knife against which said ring bears. During the period when the knife 36 is inactive, and while the tube is being fed, the table is rotated to bring another recessed seat or female die below said tube, and while the severing action is taking place, the die mechanism 10 is being operated to apply a ring to the edge of a cap placed in the seat.

Instead of a swinging knife, a reciprocatory knife may be employed, as illustrated in Figs. 6 and 7. In this embodiment, the collar carries a depending guide-way 60, in which a knife 61 reciprocates. This knife has a suitable pivotal connection 62 with the lower end of a lever 35ª corresponding in all respect to the lever 35 above described. It will be evident that this knife being actuated by the same mechanism, will periodically and automatically sever the rings from the tube, and will obviate the curved path of movement which the knife 36 has. Inasmuch however, as the wall of the tube from which the rings are cut is only about three-sixteenths of an inch thick, such curvature will be comparatively slight.

The rings cut from the tube are necessarily slightly smaller in diameter than the diameter of the tube. The thickness of the rings is uniform, varying less than one-thousandth of an inch from each other, the thickness being usually seventeen one-thousandths (17/1000) of an inch.

The knife employed in both forms of the invention herein disclosed is of the non-rotatable type, that is to say, it has no movement independently of its supporting means, but is caused to revolve around the tube by the mechanism hereinbefore set forth.

In practice the knife is maintained at a speed of 1800 revolutions a minute. It is mounted on the lower end of a longitudinally disposed lever, which is connected by collar 38, bell crank 39, yoke 40, links 44, lever 46, link 47 and strap 48 to an eccentric 49, mounted on the shaft 11. As a result of these connections, the said non-rotatable slicing knife is moved inwardly through the tube with a constant gradual, unyielding pressure and is returned in the same way. It necessarily follows that the movement of the knife with its support inward and outward is less rapid than the revolution of the support and knife about the tube. The path of movement of the knife is radial, both when moving in and out of the tube, and the knife describes the same path when cutting the ring as well as moving out of the tube to prepare for a new cut. It requires from six to ten revolutions of the knife with its support to completely sever the ring, each revolution of the knife causing the latter to cut deeper into the tube until the inner wall of the latter is reached. The cut is clean and no bur is left at the inside of the tube.

The arrangement of the tube vertically is an advantage, as it permits the rings to drop immediately into the receiver, which in the present instance, is a carrier table.

The tube is free and unsupported at its lower end, and no core is used within the tube for the knife to cut against. In fact, no core or support for the tube could be employed on account of the extreme thinness of the ring, as I have ascertained by a practical test of a machine.

I consider that I am the first to cut solder rings for can caps from a tube of solder.

The die mechanism employed in connection with the means for cutting the rings is of the type disclosed in my co-pending application, Serial No. 415,424.

From the foregoing, it is thought that the construction, operation and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

1. In a machine of the character described, the combination with means for supporting a tube of solder in a vertical position, of a movable conveyer located therebeneath and having a plurality of seats in its upper side spaced from the lower end of the tube, said seats being successively movable to positions to receive rings cut from the tube, means for holding the tube against rotation, a knife movable into and out of engagement with the tube, and means for effecting the movement of the knife to cut rings from the tube and cause the same to drop by gravity into the seats.

2. In a machine of the character described, the combination with means for applying solder rings to the edges of caps, said means including a rotatable table having a plurality of recessed seats in its upper side to receive the caps, and die mechanism movable into and out of the seats, of means for supporting a tube of solder above the table in a vertical position in line with the path of movement of the seats, means for effecting a step-by-step rotation of the table to successively position the seats beneath the tube and the die mechanism, means for effecting the downward movement of the tube, a knife movable into and out of coaction with the lower end of the tube, and means for effecting the movement of the knife to cut rings from the tube and cause them to drop by gravity into the seats.

3. In a machine of the character described, the combination with means for holding a tube of solder, of a cutter, mechanism for revolving the cutter about the tube, means for moving the cutter into and out of coaction with the tube, said means including a device movable in opposite directions, and means operated by said device for feeding the tube longitudinally.

4. In a machine of the character described, the combination with means for holding a tube of solder, of a non-rotatable cutter movable into and out of engagement with the tube, mechanism for revolving the cutter at a high rate of speed around the tube, means for moving the cutter into and out of coaction with the tube, said means including an actuating lever, and means operated by said lever for feeding the tube longitudinally.

5. In a machine of the character described, the combination with means for holding a tube of solder, of a slicing cutter movable into and out of coaction with a tube of solder held by said means and revoluble about said tube, a lever connected to and revolving with the slicing cutter, and a device having a pivotal connection with the lever for swinging the same and thereby moving the cutter.

6. In a machine of the character described, the combination with means for holding and guiding a tube of solder, of a cutter revoluble about and movable into and out of coaction with a tube held by said means, a collar revoluble about said guide, a link pivoted to the collar and connected to the knife for moving the same into and out of coaction with the tube, and means for moving the collar.

7. In a machine of the character set forth, the combination with means for holding a tube of solder, of a cutter movable into and out of coaction with a tube held by said means, a revoluble collar movable longitudinally of said tube, a lever connected to the cutter, a link pivoted to the collar and to the lever, and means for reciprocating the collar.

8. In a machine of the character set forth, the combination with means for slicing thin solder rings from the end of a tube of solder, of means for feeding the tube to the slicing means, said feeding means including rotary feed rolls, a shaft having a worm in constant gear with the feed rolls, and means for effecting an intermittent operation of the worm shaft.

9. In a machine of the character set forth, the combination with means for slicing thin solder rings from a tube of solder, of means for feeding the tube to the severing means, said means including rotary feed rolls geared together, a worm gear connected to one of the rolls, a worm shaft constantly meshing with the worm gear and having a ratchet wheel, and a dog coöperating with the ratchet wheel for effecting the intermittent movement thereof and of the worm shaft.

10. In a machine of the character set forth, the combination with spaced bearings, of a tubular guide secured to one of the bearings and extending into the other, and a slicing knife journaled in the second bearing and revolving about the guide.

11. In a machine of the character set forth, the combination with a bearing, of a revoluble collar journaled therein, a knife mounted in the collar, means for operating the knife, and a tubular guide extending into the collar and held against movement, said guide constituting means for directing a tube of solder to a position to be operated upon by the knife.

12. In a machine of the character set forth, the combination with spaced bearings, of a stationary tubular guide extending through the bearings, a sleeve revoluble about the guide and journaled in said bearings, means connected to the sleeve for revolving the same, a collar slidably mounted on the sleeve between the bearings, a knife movable in opposite directions and revoluble with the sleeve, connections between the knife and collar, and means for reciprocating the collar.

13. In a machine of the character set forth, the combination with means for securing a tube of solder with one end thereof free and unsupported, of a slicing knife movable into and out of coaction with the unsupported end of the tube, means for revolving the knife at a high rate of speed about the tube to slice thin, endless rings therefrom, and means for effecting the movement of the knife into and out of engagement with the tube.

14. In a machine of the character set forth, the combination with a rotatable conveyer having means for holding can caps, of die mechanism movable into and out of coaction with the can cap holding means to apply solder rings to the caps placed therein, means located alongside the die mechanism for holding a tube of solder with one end in line with the path of movement of the can cap holding means and spaced above the same, a non-rotatable knife movable into and out of engagement with the end of the solder tube so held, means for imparting to the knife a revoluble movement about and moving it into and out of engagement with the tube, and means for rotating the conveyer to carry the can cap holding means from the solder tube to the die mechanism.

15. In a machine of the character set forth, the combination with a receiver for the solder rings, of means for holding a tube of solder with one end free and unsupported over the receiver, a slicing knife for cutting thin rings from the end of the solder tube, and means for rapidly revolving the slicing knife about the unsupported end to sever thin endless solder rings from the tube and cause them to drop into the receiver.

16. In a machine of the character set forth, the combination with a receiver for the solder rings, of a guide tube located above the same through which a tube of solder is fed, and a non-rotatable slicing knife operating between the guide tube and receiver and revoluble about the solder tube to sever thin, endless rings from the solder tube and cause them to drop into the receiver.

17. In a machine of the character set forth, the combination with means for holding a tube of solder, of a revoluble knife support, a non-rotatable slicing knife carried by the support and revoluble therewith about the axis of the solder tube to slice thin rings from said solder tube, and means connected to the knife support and revoluble therewith to cause the knife to move into and out of coaction with the solder tube with a constant unyielding pressure.

18. In a machine of the character set forth, the combination with a guide tube through which a solder tube can be fed, of a revoluble knife supporting sleeve journaled on the guide tube, a non-rotatable slicing knife carried by the sleeve and revoluble therewith to slice thin rings from a tube of solder passed through the guide tube, and a collar slidably mounted on the supporting sleeve and revoluble therewith, said collar having connections with the knife to cause the same to move into and out of coaction with the solder tube, said connections being such as to provide a constant, unyielding engagement with the tube by the said knife.

19. In a machine of the character set forth, the combination with means for supporting a tube of solder, of a non-rotatable knife for slicing thin endless rings of solder from the end of the tube held by said means, means for supporting said knife, said knife-supporting means having a movement to carry the knife into and out of engagement with the tube, the face of the knife that is opposed to the end of the tube and in rear of the cutting edge being disposed not closer to said end of the tube than the path of movement of the cutting edge, and means for revolving the knife-supporting means about the tube so as to carry the knife into engagement therewith.

20. In a machine of the character set forth, the combination with means for supporting a tube of solder, of a non-rotatable knife for slicing thin endless rings of solder from the end of the tube held by said means, means for supporting said knife, said knife-supporting means having a movement to carry the knife into and out of engagement with the tube, the face of the knife that is opposed to the end of the tube and in rear of the cutting edge being disposed not closer to said end of the tube than the path of movement of the cutting edge, and means for revolving the knife-supporting means at a high rate of speed about the tube as an axis, carrying the knife therewith, the movement of the knife into and out of engagement with the tube being less rapid than the revoluble movement of the knife-supporting means.

21. In combination with a receiver for solder rings, means for holding a tube of solder in a vertical position with its lower end over the receiver, a slicing knife for cutting thin rings from the end of the solder tube, and means for rapidly revolving the slicing knife about the end of the tube so as to sever the rings and cause them to drop into the receiver.

22. In combination with a receiver for solder rings, means for holding a tube of solder with its free end, where the cutting is to be effected, wholly unsupported, a non-rotatable slicing knife for cutting thin rings from the unsupported end of the solder tube, and means for rapidly revolving the slicing knife around said end of the solder tube so as to sever thin endless solder rings from the tube and cause them to drop into the receiver.

23. A machine for cutting thin endless solder rings from a tube of solder, comprising means for holding a tube of solder, a slicing knife for slicing the rings from the free end of the tube, and means for revolving the knife around the tube while maintaining it in a fixed position with relation to its revolving means, and means for forcing the knife inwardly against and through the tube with a constant, unyielding pressure and withdrawing it therefrom.

24. A machine for cutting thin, endless solder rings from a tube of solder, comprising means for holding said tube of solder, a slicing knife for slicing said rings from the free end of the tube, means for revolving the knife around the tube while maintaining it in a fixed position with relation to its revolving means, and means for forcing the knife inwardly against and through the tube with a constant unyielding pressure and withdrawing it therefrom, said knife having a movement radially of the tube and describing the same path of radial movement when cutting and clearing the tube.

25. In a machine of the character set forth, the combination with a conveyer having means for holding can caps, of die mechanism movable into and out of coaction with the can cap-holding means to apply solder rings to the caps placed therein, means located adjacent to the die mechanism for holding a tube of solder with one end in line with the path of movement of the can cap-holding means, a slicing knife, and means for revolving the knife about and moving it into engagement with the tube to slice rings from the latter and cause them to drop onto the conveyer.

26. In a machine of the character described, the combination with means for supporting a tube of solder and holding the same against rotation in a substantially vertical position, of a movable conveyer located therebeneath and spaced from the lower end of the tube, and constituting part of the mechanism for applying solder rings to can caps, said conveyer being successively movable to positions to receive rings cut from the tube, a knife movable into and out of engagement with the tube, and means for revolving the knife about the tube to cut rings from the tube and cause them to drop by gravity onto the conveyer.

27. In a machine of the character set forth, the combination with means for supporting a tube of solder, with one end thereof free and unsupported and held from rotary movement, of a non-rotatable shearing knife movable into and out of coaction with the unsupported end of the tube, said knife being so connected to the solder supporting means as to have a relatively rigid longitudinal relation thereto whereby the same distance is kept between the solder support and the knife at all times, and means for revolving the knife about the tube and about an axis to which the tube is substantially concentrically disposed.

28. In a machine of the character described, the combination with means for guiding and holding a tube of solder, of a cutter movable into and out of co-action with a tube held by said means, a collar revoluble about the said tube above its outer end, a bell crank lever pivoted to the collar and carrying the said cutter, the latter being fixed to the lever and having no movement independent thereof, and means connected with the bell crank lever for moving the said cutter into and out of engagement with the said tube.

29. In a machine of the character described, the combination with means for guiding and holding a tube of solder, of a non-rotatable cutter, means for moving the cutter into and out of coaction with a tube held by the said means, means for feeding the said tube longitudinally, means for revolving the cutter about the said tube, the said means for feeding the tube being operated by the means that moves the cutter into and out of coaction with the tube and while the cutter is out of engagement.

30. In a machine of the character described, the framework having spaced bearings, a tubular guide secured to one of the bearings and extending through the other, a collar journaled in the second bearing, a slicing knife rigidly connected to the collar, and means for imparting a revoluble movement to the knife about the guide through the said collar.

31. In a machine of the character described, the framework having spaced bearings, a tubular guide secured to one of the bearings and passing loosely through the other bearing, a revoluble sleeve surrounding the tube, means for imparting a revoluble movement to the said sleeve, means for feeding a tube of solder through the said guide, a collar journaled in the other bearing and rigidly secured to the sleeve, a cutter, and means for connecting the said cutter to the said collar and for causing the cutter to move into and out of coaction with the tube of solder.

32. In a machine of the character described, the combination with means for supporting a tube of solder, of a cutter movable into and out of coaction with a tube of solder held by said means, and a lever arranged longitudinally of the said tube and carrying the cutter which is arranged transversely of the tube.

33. In a machine of the character described, the combination with means for holding a tube of solder, a non-rotatable knife for slicing thin endless rings of solder from the end of the tube held by said means, means for supporting and revolving said knife about the said tube, said knife-supporting means having a movement to carry the said knife into and out of engagement with the said tube, the upper face of the knife, or that face closest to the said tube, being flat or horizontal and the under face thereof having a downward taper, for the purpose set forth.

34. In a machine of the character described, the combination with means for holding a tube of solder vertically with its outer end free and unsupported, a cutter operating beyond where the tube is supported and acting directly upon the free and unsupported end of the said tube to cut thin endless rings of solder therefrom, means for revolving the cutter about the said tube, and means for moving the said cutter into and out of coaction with the said tube, said movement being constant, gradual and unyielding.

In testimony, that I claim the foregoing as my own, I have hereto affixed my signature in the presence of two witnesses.

WALTER J. PHELPS.

Witnesses:
JOHN H. SIGGERS,
FANNIE WAGNER.